United States Patent
Misso et al.

[11] Patent Number: 6,088,193
[45] Date of Patent: Jul. 11, 2000

[54] PAWL LATCH FOR A DISC DRIVE

[75] Inventors: Nigel F. Misso, Bethany; Steve S. Eckerd, Oklahoma City, both of Okla.

[73] Assignee: Seagate Technology, Inc., Scotts Valley, Calif.

[21] Appl. No.: 09/109,334

[22] Filed: Jun. 30, 1998

Related U.S. Application Data

[60] Provisional application No. 60/025,608, Feb. 20, 1998.

[51] Int. Cl.[7] ........................................................ G11B 5/54
[52] U.S. Cl. ............................................................ 360/105
[58] Field of Search .................................. 360/104, 105, 360/106, 107

[56] References Cited

U.S. PATENT DOCUMENTS

| | | | |
|---|---|---|---|
| 5,034,837 | 7/1991 | Schmitz | 360/105 |
| 5,532,891 | 7/1996 | Tsujino | 360/106 |
| 5,583,724 | 12/1996 | Kim et al. | 360/105 |
| 5,612,842 | 3/1997 | Hickox et al. | 360/105 |
| 5,636,090 | 6/1997 | Boigenzahn et al. | 360/105 |
| 5,671,104 | 9/1997 | Takahashi et al. | 360/105 |
| 5,812,345 | 9/1998 | MacPherson et al. | 360/105 |

*Primary Examiner*—David Davis
*Attorney, Agent, or Firm*—Crowe & Dunlevy

[57] ABSTRACT

A latch for a disc drive wherein the disc drive has an actuator that is rotatably supported for moving an array of read/write heads radially across a data storage disc between a parked location and a data storage location, the parked location providing a landing surface for the read/write heads when the disc drive is non-operational, the latch preventing the actuator from rotating so that the read/write heads remain in the parked location while the disc drive is non-operational. The disc drive has a voice coil motor for moving the actuator, the voice coil motor including a magnet assembly having a pair of opposed magnet members supported by opposing poles. The latch is interposed between the poles, having a base member that pivotally supports a latch pawl between a latched and an unlatched mode. A latch pole is magnetically supported by the poles to urge the latch pawl to the desired mode. In the latched mode a groove in the latch pawl receivingly engages a pin supported by the actuator and retains the pin therein to prevent rotation of the actuator. In the unlatched mode the latch pawl pivots to disengage the pin from the groove to permit rotation of the actuator. The latch has an outer stop that abuttingly engages the pin when the actuator rotates the read/write heads to an outer extremity of the data storage location.

16 Claims, 4 Drawing Sheets

PAWL LATCH FOR A DISC DRIVE

RELATED APPLICATIONS

This application claims the benefit of U.S. Provisional Application No. 60/075,608 entitled LATCH FOR DISC DRIVES, filed Feb. 20, 1998.

FIELD OF THE INVENTION

The present invention relates generally to the field of disc drive data storage devices, and more particularly but not by way of limitation, to a latch for an actuator of a disc drive to retain the read/write heads in a parked location during times when the disc drive is non-operational.

BACKGROUND OF THE INVENTION

Modern disc drives are commonly used in a multitude of computer environments, ranging from super computers to notebook computers, to store large amounts of data in a form that is readily available to a user. Typically, a disc drive has one or more magnetic discs that are rotated by a spindle motor at a constant high speed. Each disc has a data storage surface divided into a series of generally concentric data tracks that are radially spaced across a band having an inner diameter and an outer diameter. The data is stored within the data tracks on the disc surfaces in the form of magnetic flux transitions. The flux transitions are induced by an array of read/write heads. Typically, each data track is divided into a number of data sectors where data is stored in fixed size data blocks.

The read/write head includes an interactive element such as a magnetic transducer. The interactive element senses the magnetic transitions on a selected data track to read the data stored on the track. Alternatively, the interactive element transmits an electrical signal that induces magnetic transitions on the selected data track to write data to the track.

Each of the read/write heads is mounted to a rotary actuator arm and is selectively positioned by the actuator arm over a pre-selected data track of the disc to either read data from or write data to the data track. The read/write head includes a slider assembly having an air bearing surface that, in response to air currents caused by rotation of the disc, causes the head to fly adjacent to the disc surface with a desired gap separating the read/write head and the corresponding disc.

Typically, multiple center-open discs and spacer rings are alternately stacked on a spindle motor hub. The hub, defining the core of the stack, serves to align the discs and spacer rings around a common axis. Collectively the discs, spacer rings and spindle motor hub define a disc pack assembly. The surfaces of the stacked discs are accessed by the read/write heads which are mounted on a complementary stack of actuator arms which form a part of an actuator assembly. The actuator assembly generally includes head wires which conduct electrical signals from the read/write heads to a flex circuit which, in turn, conducts the electrical signals to a flex circuit connector mounted to a disc drive base deck.

When the disc drive is not in use, the read/write heads are brought to rest upon parked locations, which are separate from the data storage locations of the discs. Typically, each parked location provides a landing zone on each of the disc surfaces where the read/write heads are positioned before the rotational velocity of the spinning discs decreases below a threshold velocity which sustains the air bearing. The parked location is typically located near the inner diameter of the discs.

Once the heads are positioned in the parked location, it is necessary to secure the actuator assembly by a latching arrangement to prevent the heads from subsequently moving out onto the data locations of the discs while the disc drive is not in use. Latching arrangements are well known in the art and have included various configurations of springs, solenoids and magnets to secure and release the actuator. For example, see U.S. Pat. No. 5,187,627 entitled MAGNETIC LATCH AND CRASH STOP, issued Feb. 16, 1993, to Hickox and Stram; U.S. Pat. No. 5,224,000 entitled CRASH STOP AND MAGNETIC LATCH FOR A VOICE COIL ACTUATOR, issued Jun. 29, 1993, to Casey and West; and U.S. Pat. No. 5,231,556 entitled SELF-HOLDING LATCH ASSEMBLY, issued Jul. 27, 1993, to Blanks. All of these references are assigned to the assignee of the present invention.

Associated problems with such devices have limited the application in which they can be used. For example, a continuing trend in the industry is the reduction in size of modern disc drives. As a result, the discs of modern disc drives increasingly have smaller diameters and tighter spacings. Although providing increasing amounts of storage capacity, narrow vertical spacing of the discs gives rise to a problem of increased sensitivity to external mechanical shock. Additionally, as disc drives continue to decrease in size, smaller heads, thinner substrates, longer and thinner actuator arms and thinner gimbal assemblies continue to be incorporated into the disc drives. These factors significantly increase the need to protect the disc drives from incidental contact between the actuator arm/gimbal assemblies and the disc surfaces. Furthermore, market requirements demand ever increasing non-operating shock performance.

Consequently, there has not been available a latching device which will universally meet the ever increasing demands of disc latching that will protect the discs from the deleterious effects of non-operational shock such as can occur during shipping and handling. Protection from this and other non-operating mechanical shocks continue to be a major problem to the industry.

Accordingly, there is a need for an improved latch apparatus for a disc drive to reduce the susceptibility of damage to the disc drive as a result of non-operating mechanical shocks.

SUMMARY OF THE INVENTION

The present invention provides a latch for a disc drive assembly, wherein the disc drive assembly has a disc pack with a data storage disc having a parked location and a data storage location. The disc pack includes a spindle motor for rotating the disc. An actuator of the disc drive assembly is rotatably supported in a plane parallel to that of the disc and supports an array of read/write heads in radial movement across the disc in data reading and writing relationship to the disc.

The disc drive has a voice coil motor that interacts with the actuator to move the read/write heads between the parked location and the data storage location. The parked location provides a landing zone for the read/write heads when the disc drive is non-operational.

The voice coil motor includes a magnet assembly having a pair of opposing magnet members supported by a pair of opposing poles. The latch has a base supported by one of the poles, and the latch is generally interposed between the poles.

A latch pawl is pivotally supported by the base for movement between a latched and an unlatched mode. In a preferred embodiment the latch pawl pivots about an axis that is orthogonal to an axis of rotation of the disc. The latch pawl supports a latch pole which is a magnetically permeable member that magnetically urges the latch pawl to the desired mode, whether the latched or the unlatched mode.

The latch pawl has a groove that receivingly engages a pin that is supported by the actuator when the latch pawl is in a latched mode, the latch pawl retaining the pin in the groove and thereby preventing rotation of the actuator so that the read/write heads remain in the parked location of the disc. In the unlatched mode the latch pawl pivots and receivingly disengages the pin to permit freedom of movement of the actuator to move the read/write heads to the data storage location. The latch furthermore has an outer stop which abuttingly engages the pin when the read/write heads are at an outer extremity of the data storage location.

These and other advantages and features of the present invention will be apparent from the following description when read in conjunction with the drawings and appended claims.

BRIEF DESCRIPTION OF THE DRAWINGS

FIG. 6 is a top view of a portion of the disc drive of FIG. 1 showing the actuator assembly in the outer extremity of the data storage location.

DETAILED DESCRIPTION

Figure 1:
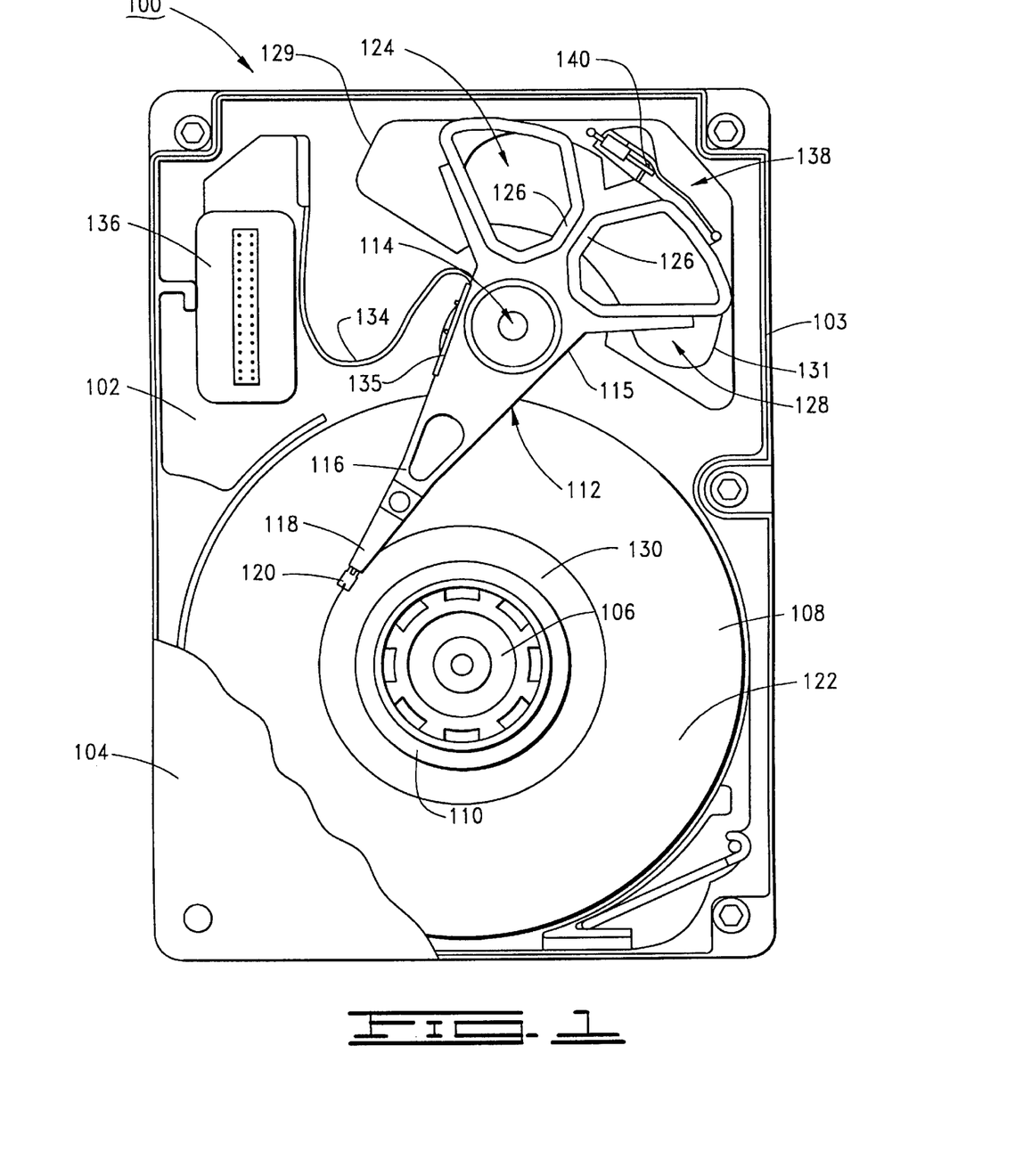
FIG. 1 is a top view of a disc drive constructed in accordance with the present invention.

Referring to the drawings in general, and more particularly to FIG. 1, shown therein is a top view of a disc drive 100 constructed in accordance with a preferred embodiment of the present invention. The disc drive 100 includes a base deck 102 to which various disc drive components are mounted, and a top cover 104, which together with the base deck 102 and a perimeter gasket 103 provide a sealed internal environment for the disc drive 100. The top cover 104 is shown in a partial cut-away fashion to expose selected components of interest. It will be understood that numerous details of construction of the disc drive 100 are not included in the following description, as such, they are well known to those skilled in the art and are believed to be unnecessary for the purpose of describing the present invention.

Mounted to the base deck 102 is a spindle motor 106 to which a plurality of discs 108 are mounted and secured by a clamp ring 110 for rotation at a constant high speed. Adjacent the discs 108 is an actuator assembly 112 which rotates about a pivot bearing assembly 114 in a plane parallel to the discs 108. The actuator assembly 112 includes an E-block 115 that is supported by the pivot bearing assembly 114. The E-block 115 has actuator arms 116 (only one shown) that support load arm assemblies 118. The load arm assemblies 118 in turn support read/write heads 120, with each of the read/write heads 120 adjacent a surface of one of the discs 108. As mentioned hereinabove, each of the discs 108 has a data storage location with a data recording surface 122 divided into concentric circular data tracks (not shown), and the read/write heads 120 are positionably located adjacent data tracks to read data from, or write data to, the tracks.

The actuator assembly 112 is controllably positioned by a voice coil motor (VCM) 124, the VCM 124 having an actuator coil 126 immersed in the magnetic field generated by a magnet assembly 128. A magnetically permeable flux path, such as provided by a steel plate 129 (sometimes referred to as pole 129), is mounted above and below the actuator coil 126 to complete the magnetic circuit of the VCM 124. When controlled current is passed through the actuator coil 126, an electromagnetic field is set up which interacts with the magnetic circuit of the VCM 124 to cause the actuator coil 126 to move relative to the magnet assembly 128 in accordance with the well-known Lorentz relationship. As the actuator coil 126 moves, the actuator assembly 112 rotates about the pivot bearing assembly 114 causing the actuator arms 116 to move the read/write heads 120 adjacent to, and across, the discs 108. Located near the clamp ring 110 on each of the discs is a parked location having a landing zone 130, the landing zones 130 comprising designated areas where the read/write heads 120 come to rest when the disc drive 100 is nonoperational, thereby preventing the read/write heads 120 from damaging the data storage location.

To provide the requisite electrical conduction paths between the read/write heads 120 and disc drive read/write circuitry (not shown), head wires (not separately shown) are routed on the actuator assembly 112 from the read/write heads 120, along the load arm assemblies 118 and the actuator arms 116, to a flex circuit 134. The head wires are secured by way of a suitable soldering process to corresponding pads of a printed circuit board (PCB) 135 of the flex circuit 134. In turn, the flex circuit 134 is connected to a flex circuit bracket 136 in a conventional manner which, in turn, is connected through the base deck 102 to a disc drive PCB (not shown) mounted to the underside of the base deck 102. The disc drive PCB provides the disc drive read/write circuitry which controls the operation of the read/write heads 120, as well as other interface and control circuitry for the disc drive 100.

During times when the disc drive is non-operational it is desirable to provide a latch 138 to latchingly retain the actuator assembly 112 in the position whereby the read/write heads 120 remain within the landing zones 130. It will be noted that when the disc drive 100 is non-operational the read/write heads 120 directly contact the corresponding discs 108 because no air current from the disc rotation sustains the air bearing. If the actuator assembly 112 were to rotate during the non-operational mode of the disc drive 100 then the read/write heads 120 would contact the data recording surface 122 in the data storage location. Physical contact with the magnetic surfaces of the data storage location will corrupt the integrity of the magnetic media making it unfit for data storage and retrieval.

One common source of forces that tend to rotate the actuator assembly 112 during the non-operational state is external vibrations and shocks associated with the general use and environment in which a personal computer is used. This is especially true with laptop computers which are inherently subjected to handling and use that subject the internal components to shocks and vibrations.

The latch 138 latchingly engages a pin 140 that is supported by the actuator assembly 112 when positioned as in FIG. 1 so that the read/write heads 120 are on the landing zones 130 of the parked location. With the latch 138 in a latched mode, as described fully below, the pin 140 is retained by the latch 138 to resist rotation of the actuator assembly 112. With the latch 138 in an unlatched mode, as described fully below, the pin 140 is disengaged from the latch 138 and the actuator assembly 112 can rotate unencumbered.

Figure 2:
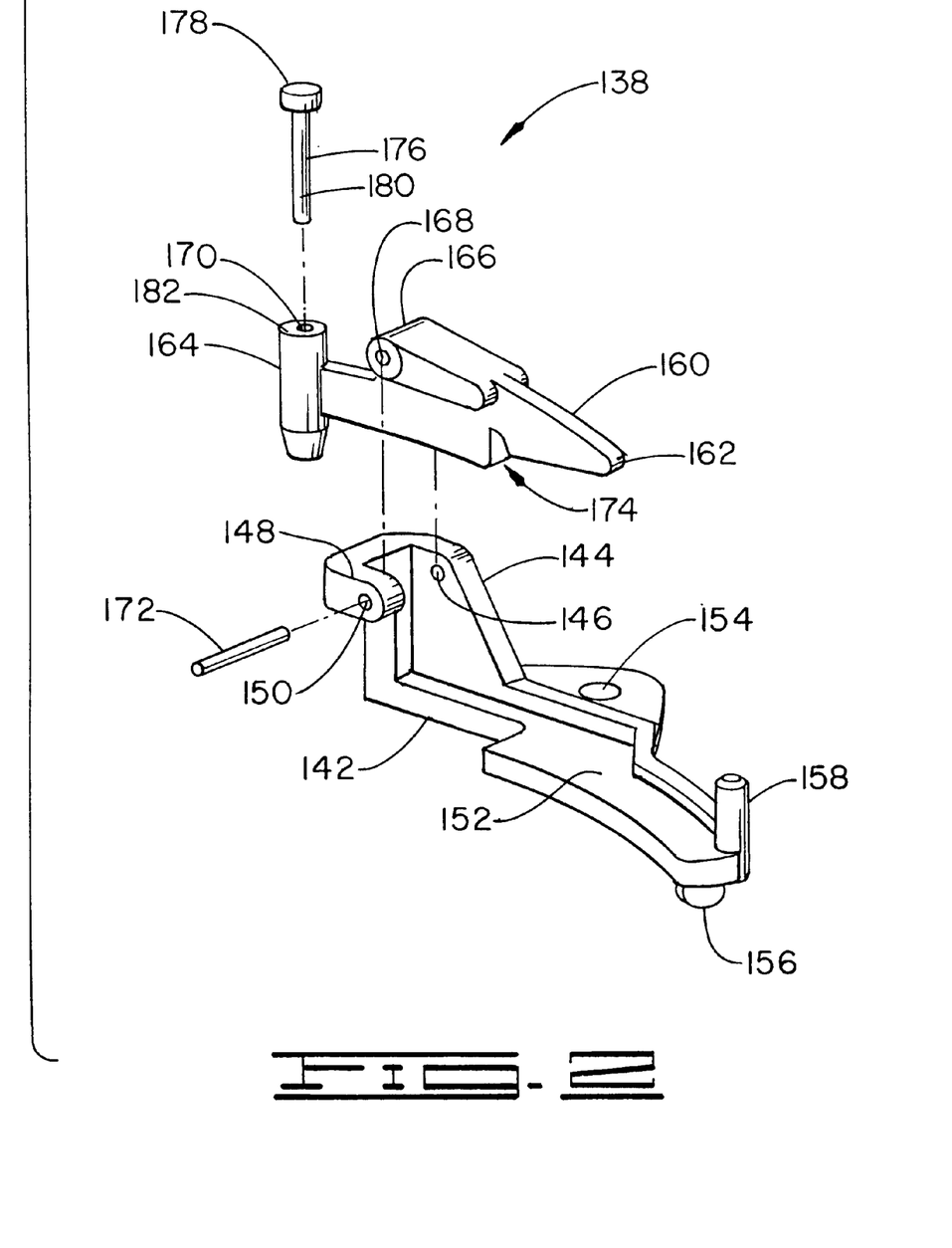
FIG. 2 is an exploded perspective view of the latch of the disc drive of FIG. 1.

Turning now to FIG. 2, the latch 138 has a base 142 with an upstanding portion 144 that forms an aperture 146, and a clevis portion 148 that forms an aperture 150 that is axially aligned with the aperture 146. The upstanding portion 144 extends from a horizontal base member 152 that forms a locating aperture 154, and which supports an extended locating tab 156 and outer stop 158.

A latch pawl 160 has a tapered nose 162 at a leading end thereof, a vertically disposed barrel 164 at a distal end thereof, and a medially disposed horizontal barrel 166. The barrel 166 forms a passageway 168 extending therethrough. In like manner the barrel 164 forms a passageway 170 therethrough.

The latch pawl 160 is joined to the base 142 by aligning the passageway 168 with the aperture 146 and the aperture 150 and disposing a pin 172 therein to provide a pinned connection. In a preferred embodiment, the diameter of the pin 172 is slightly larger than the diameter of the apertures 146, 150 so that the pin 172 is frictionally retained therein, and the passageway 168 has a diameter slightly larger than the pin 172 diameter so that the latch pawl 160 freely pivots about the pin 172. It will be clear to one skilled in the art that alternative equivalent embodiments exist for the pinned connection, such as but not limited to frictionally retaining the pin 172 in the passageway 168 and clearingly rotating the pin 172 within the aperture 146 and the aperture 150. Another equivalent preferred embodiment is to make the pin 172 integral to either the latch pawl 160 or the base 142.

The bottom surface of the tapered nose 162 terminates in the formation of a substantially vertical groove 174 which receivingly engages the pin 140 of the actuator assembly 112 in a latched mode and thereby latchingly retains the actuator assembly 112 to prevent rotation thereof.

Finally, a latch pole 176 is provided, having a head 178 and a shank 180, the latter being retainingly disposed in the passageway 170 so that the head 178 is operably positioned by an upper surface 182 of the barrel 164. In a preferred embodiment the latch pole 176 is of a two piece construction, made by the joinder of the head 178 made of a magnetized material, such as a nickel plated neodymium-iron-boron magnet, to the shank 180 made of magnetically permeable material such as a material of a 400-series stainless steel. The head 178 and shank 180 are joined by adhesive in such a two piece construction. Alternatively, in a preferred embodiment the latch pole 176 is of a simplified one-piece construction and made of a magnetically permeable material such as a material of a 400-series stainless steel.

Figure 3:
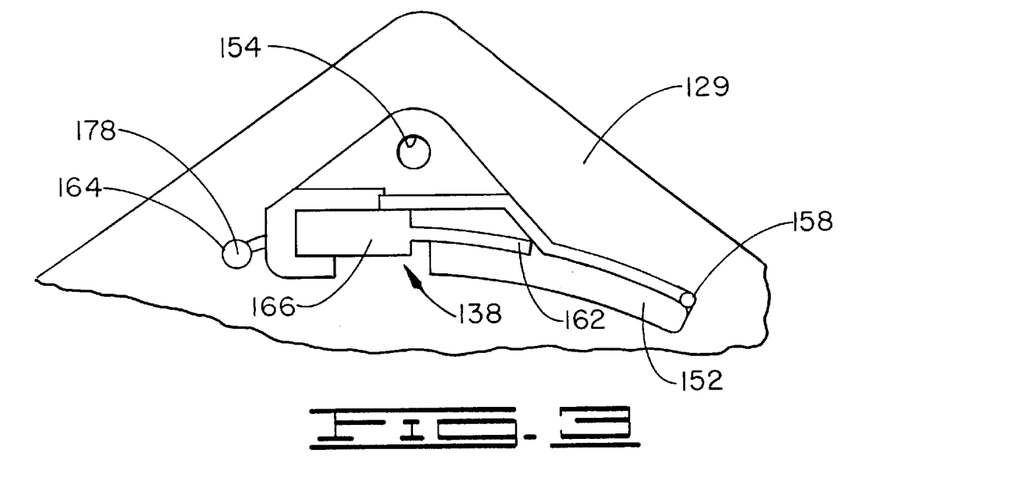
FIG. 3 is a top view of the latch of FIG. 2.

FIG. 3 shows a top view the latch 138 attached to the bottom pole 129, the top pole 129 being omitted for clarity sake. It will be noted that the nose 162 portion of the latch pawl 160 forms a radius of curvature that corresponds to the curvature of path that the pin 140 travels as the actuator assembly 112 rotates. This allows the use of the thinnest possible material web in construction of the nose 162 which is advantageous in minimizing the weight thereof to facilitate the unlatching action of the latch 138, as will be explained fully below.

The latch 138 is located by the locating tab 156 (see FIG. 2) which is disposed in a closely fitting opening 185 (see FIG. 4) in the bottom pole 129. When so disposed, the aperture 154 aligns with a threaded opening (not shown) in the bottom pole 129 so that a threaded fastener (not shown) is used to attach the base member 152 to the pole 129.

Figure 4:
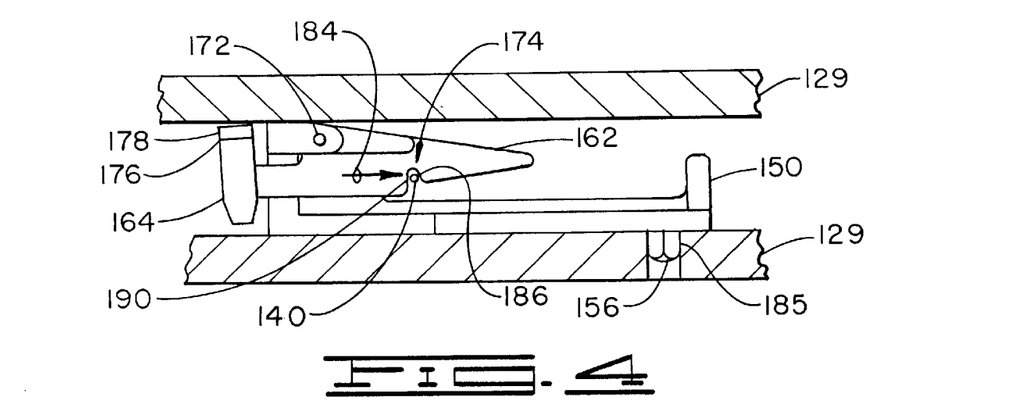
FIG. 4 is an elevational view of the latch of FIG. 2 in the latched position.
Figure 5:
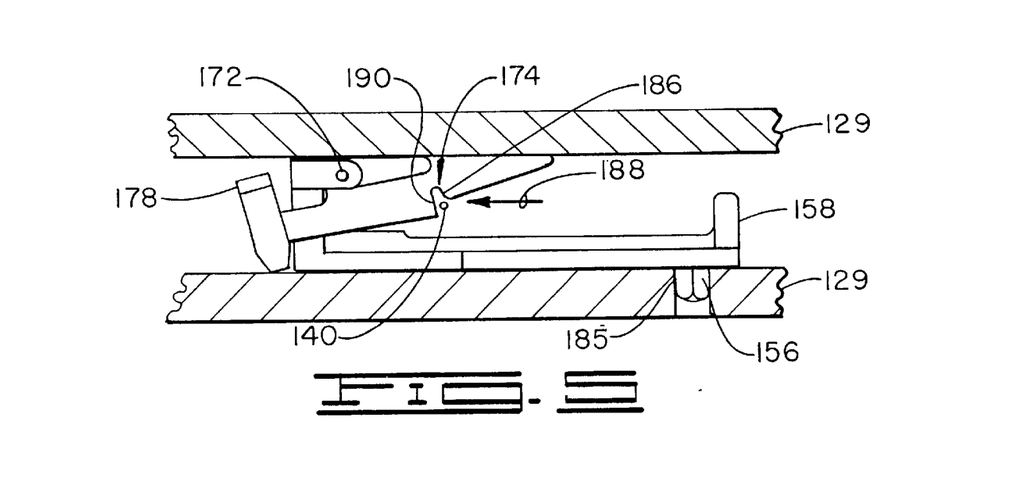
FIG. 5 is an elevational view of the latch of FIG. 2 in the unlatched position.

FIG. 4 shows the latch 138 in the latched mode, wherein the pin 140 is constrained by the groove 174 in the latch pawl 160. The latched mode is urged by a magnetic engagement of the head 178 and the top pole 129. To switch the latch 138 to the unlatched mode, as shown in FIG. 5, the actuator assembly 112 is energized so as to move the pin 140 in a direction denoted by arrow 184, the pin 140 thus pressingly engaging a side 186 (also referred to as an "unlatching surface") of the groove 174 with a force sufficient to create a torque about the pivot pin 172 to overcome the magnetic force coupling the head 178 and top pole 129. After the head 178 is separated from the top pole 129, an imbalance of the latch 138 about the pivot pin 172 causes the latch pole 176 and barrel 164 to move downward, thus pivoting the nose 162 upward as shown in FIG. 5. This upward pivotal position of the nose 162 clearingly disengages the pin 140 from the groove 174, permitting lateral movement of the pin 140 and hence rotational movement of the actuator assembly 112. The latch 138 is retained in the unlatched position by a magnetic engagement between a distal end of the shank 180 and the bottom pole 129.

The reverse of the foregoing sequence is performed in order to move the latch 138 from an unlatched position, as in FIG. 5, to a latched position as shown by FIG. 4. In doing so, the pin 140 is moved in a direction denoted by arrow 188 to pressingly engage an opposing side 190 (also referred to as a "latching surface") of the groove 174. The pin 140 is moved in a direction denoted by arrow 188 with sufficient force to overcome the magnetic attraction of the shank 180 and the bottom pole 129, and thus to impart a torque sufficient to rotate the latch pawl 160 about the pivot pin 172 so that the head 178 magnetically engages the top pole 129 to urge the latch 138 to the latched mode.

FIG. 6 shows the actuator assembly 112 operably rotated to an outer extremity of the data storage location as denoted by the diameter 190. This outer extremity is the outer limit of the radial movement of the read/write heads 120 beyond which no data is stored. It will be noted that the actuator assembly 112 is prevented from rotation beyond the outer diameter 190 by a pressing engagement of the pin 140 against the outer stop 158. In this manner, the constraint of the pin 140 between the latched position of the latch 138 and the outer stop 158 effectively constrains the rotational position of the read/write heads 120 between the landing zones 130 and the outer diameter 190. As described above, in a non-operational state of the disc drive 100 the latch 138 assumes a latched mode to constrain the read/write heads 120 in the parked location of the disc 108.

Returning to FIG. 1, it will be understood by one skilled in the art that an advantage of the present invention lies in the pivotal motion of the latch pawl 160 being orthogonal to the axis of notation of the spinning discs 108. As such, any vibration or shock produced by the spinning discs 108 act in a plane that is orthogonal to the motion of the latch pawl 160, thereby not affecting the position thereof whether the latch pawl 160 be in the latched or the unlatched mode. This feature is advantageous in part because otherwise the latch pole 176 would have to provide a strong retention force in order to compensate actuator rotation forces to maintain the desired latched or unlatched mode.

The present invention provides a latch (such as 138) for a disc drive (such as 100), wherein the disc drive has a rotating actuator assembly (such as 112) which supports and positions an array of read/write heads (such as 120) in data reading and writing relationship to a number of data discs (such as 108). The data discs have landing zones (such as 130) making a parked location wherein the read/write heads land when the disc drive is non-operational.

The actuator is rotated by a VCM (such as 124) that has a magnet assembly (such as 128) that includes a pair of opposing poles (such as 129). The latch has a base (such as 142) attached to one of the poles, and the latch is interposed between the poles.

A latch pawl (such as 160) is pivotally supported by the base by a pinned connection therebetween. In a preferred embodiment the latch pawl pivots about an axis that is orthogonal to an axis of rotation of the discs. A latch pole (such as 176) is supported by the latch pawl and magnetically engages the top pole to urge the latch into a latched mode, and alternatively the latch pole magnetically engages the bottom pole member to urge the latch into an unlatched mode.

The actuator assembly has a pin (such as 140) which is receivingly engaged by a groove (such as 174) in the latch pawl to retain the pin and resist rotation of the actuator assembly when the latch is in the latched mode. In the unlatched mode the latch pawl pivots to receivingly disengage the pin so that the actuator assembly is free to rotate. The latch has an outer stop (such as 158) to limit the rotation of the actuator assembly when the read/write head has moved to an outer extremity of a data storage location of the disc.

It is to be understood that even though numerous characteristics and advantages of various embodiments of the present invention have been set forth in the foregoing description, together with details of the structure and function of various embodiments of the invention, this disclosure is illustrative only, and changes may be made in details especially in matters of structure and arrangement of parts within the principles of the present invention to the full extent indicated by the broad general meaning of the terms in which the appended claims are expressed. For example, the particular elements may vary depending on the particular application for the latch for a disc drive while maintaining substantially the same functionality without departing from the scope and spirit of the present invention.

What is claimed is:

1. A latch for use in a disc drive of the type having a storage disc with a parked location and a data storage location and an actuator which supportingly moves a read/write head between the parked location and the data storage location, the actuator having a stop pin, the latch comprising:
   a base member supported by the disc drive;
   a latch pawl pivotally supported by the base member and movable between a latched mode and an unlatched mode, the latched mode providing the latch pawl in operable engagement with the actuator to retain the read/write head in the parked location, the unlatched mode providing the latch pawl in operable disengagement with the actuator to permit moving the read/write head to the data storage location, the latch pawl having a groove with a latching surface and an unlatching surface, wherein the actuator pressingly engages the stop pin against the latching and unlatching surfaces to effect the latched mode and the unlatched mode, respectively, and wherein the stop pin is retained in the groove while the latch pawl is in the latched mode; and
   a latch pole supported by the latch pawl for urging the latch pawl to the latched mode and to the unlatched mode, wherein the read/write head is moved from the data storage location to the parked location by moving the stop pin laterally to contact the latching surface with sufficient force to rotate the latch pawl to the latched mode.

2. The latch of claim 1 wherein the disc drive further comprises a magnet assembly and wherein the actuator has an actuator coil that when energized with a controlled voltage produces an electromagnetic force that interacts with a magnetic force field of the magnet assembly to move the actuator, the base member supported by the magnet assembly.

3. The latch of claim 2 wherein the disc drive further comprises a base deck and a top cover, and wherein the magnet assembly comprises:
   a lower pole supported by the base deck;
   a lower magnet supported by the lower pole member;
   an upper pole supported by the top cover; and
   an upper magnet supported by the upper pole member.

4. The latch of claim 3 wherein the disc is rotated by a spindle motor, wherein an axis of disc rotation is orthogonal to a pivot axis of the latch pawl.

5. The latch of claim 4 wherein the latch pole comprises:
   a shank attached to the latch pawl; and
   a head depending from the shank; wherein the shank and head further comprise a magnetically permeable material so that the head is magnetically engaged by the upper pole member to urge the latch pawl to the latched mode a nd the shank is magnetically engaged by the lower pole member to urge the latch pawl to the unlatched mode.

6. The latch of claim 5 wherein the head contacts the upper pole member along a head contacting surface, and the shank contacts the lower pole member along a shank contacting surface, and wherein the head contacting surface is larger than the shank contacting surface.

7. The latch of claim 6 wherein th e head comprises a magnetized material.

8. The latch of claim 1 wherein the read/write head is moved from the parked location to the data storage location by moving the stop pin laterally to contact the unlatching surface with sufficient force to rotate the latch pawl to the unlatched mode.

9. A disc drive, comprising:
   a base deck;
   a disc pack supported by the base deck, the disc pack comprising:
      a spindle motor supported by the base deck; and
      a disc supported by the spindle motor for rotation when the disc drive is operational, the disc having a data storage surface and a landing zone;
   an actuator pivotally supported by the base deck, the actuator supporting a read/write head at a first end and a stop pin at a second end, the actuator moving the read/write head radially between the landing zone and the data storage surface; and
   a latch for retaining the actuator so the read/write head remains over the landing zone, the latch comprising:
      a base member supported by the base deck;
      a latch pawl pivotally supported by the base member and movable between a latched mode and an unlatched mode, the latched mode providing the latch pawl in operable engagement with the actuator to retain the read/write head over the landing zone, the unlatched mode providing the latch pawl in operable disengagement with the actuator to permit moving the read/write head to the data storage surface, the latch pawl having a groove with a latching surface and an unlatching surface, wherein the actuator pressingly engages the stop pin against the latching and unlatching surfaces to effect the latched mode and the unlatched mode, respectively, and wherein the stop pin is retained in the groove while the latch pawl is in the latched mode; and a latch pole supported by the latch pawl for urging the latch pawl to the latched mode and to the unlatched mode, wherein the read/write head is moved from the data storage surface to the landing) zone by moving the stop pin laterally to contact the latching surface with sufficient force to rotate the latch pawl to the latched mode.

10. The latch of claim 9 wherein the disc drive further comprises a magnet assembly and wherein the actuator has an actuator coil that when energized with a controlled voltage produces an electromagnetic force that interacts with a magnetic force field of the magnet assembly to move the actuator.

11. The latch of claim 10 wherein the disc drive further comprises a top cover and wherein the magnet assembly comprises:

a lower pole supported by the base deck;

a lower magnet supported by the lower pole member;

an upper pole supported by the top cover; and an upper magnet supported by the upper pole member.

12. The latch of claim 11 wherein the base member is attached to the lower pole member and the latch is interposed between the poles.

13. The latch of claim 12 wherein the latch pole comprises:

a shank attached to the latch pawl; and a head depending from the shank; and wherein the shank and head further comprise a magnetically permeable material so that the head is magnetically engaged by the upper pole member to urge the latch pawl to the latched mode and the shank is magnetically engaged by the lower pole member to urge the latch pawl to the unlatched mode.

14. The latch of claim 13 wherein the head contacts the upper pole member along a head contacting surface, and the shank contacts the lower pole member along a shank contacting surface, and wherein the head contacting surface is larger than the shank contacting surface.

15. The latch of claim 14 wherein the head comprises a magnetized material.

16. The disc drive of claim 9 wherein the read/write head is moved from the landing zone to the data storage surface by moving the stop pin laterally to contact the unlatching surface with sufficient force to rotate the latch pawl to the unlatched mode.

* * * * *

UNITED STATES PATENT AND TRADEMARK OFFICE
CERTIFICATE OF CORRECTION

PATENT NO.  : 6,088,193　　　　　　　　　　　　　　　　　　　Page 1 of 1
DATED       : July 11, 2000
INVENTOR(S) : Nigel F. Misso, Steve S. Eckerd It is certified that error appears in the above-identified patent and that said Letters Patent is hereby corrected as shown below:

<u>Column 6,</u>
Line 50, replace "axis of notation" with -- axis of rotation --.

<u>Column 8,</u>
Line 22, replace "a nd" with -- and --.
Line 30, replace "t he" with -- the --.

<u>Column 9,</u>
Line 6, replace "landing) zone" with -- landing zone --.

Signed and Sealed this

Second Day of April, 2002

Attest:

JAMES E. ROGAN
*Director of the United States Patent and Trademark Office*

*Attesting Officer*